United States Patent [19]

Kohyama et al.

[11] 4,377,302
[45] Mar. 22, 1983

[54] THREADED JOINT WITH HIGH GAS-LEAK-TIGHTNESS FOR OIL AND GAS WELL PIPE

[75] Inventors: Fuzimasa Kohyama, Kitakyusyushi; Yasusuke Inoue; Sigeyuki Akase, both of Sagamiharashi, all of Japan

[73] Assignee: Nippon Steel Corporation, Tokyo, Japan

[21] Appl. No.: 292,027

[22] Filed: Aug. 11, 1981

[30] Foreign Application Priority Data

May 14, 1981 [JP] Japan ................................ 56-71406

[51] Int. Cl.$^3$ .......................................... F16L 15/00
[52] U.S. Cl. ................................... 285/334; 285/390
[58] Field of Search ............... 285/334, 333, 390, 355, 285/332.2, 332.3

[56] References Cited

U.S. PATENT DOCUMENTS

| | | | |
|---|---|---|---|
| 2,062,407 | 12/1936 | Eaton | 285/334 |
| 2,893,759 | 7/1959 | Blose | 285/390 X |
| 3,307,860 | 3/1967 | Blount et al. | 285/334 X |
| 3,870,351 | 3/1975 | Matsuki | 285/334 |
| 4,161,332 | 7/1979 | Blose | 285/334 |

Primary Examiner—Thomas F. Callaghan
Attorney, Agent, or Firm—Wenderoth, Lind & Ponack

[57] ABSTRACT

A threaded joint with high gas-leak-tightness for oil and gas well pipe comprises a box having an internal female thread and a pin having an external male thread, the box and pin being screwed together in use. On a non-threaded tip portion of the pin, a front shoulder formed stepwisely and a tip shoulder are provided, and between these shoulders, a conical face tapered convergently toward the tip side of the pin is provided. On a non-threaded portion of the box corresponding to the non-threaded portion of the pin, there are provided two shoulders respectively corresponding to said front step shoulder and said tip shoulder and, between these two shoulders, there is provided a conical face corresponding to said conical face on the pin.

This threaded joint is characterized in that when said pin and box are made up, the sealing of the first sealing portion formed by metal-to-metal contact between said two conical faces and of the second sealing portion formed by the abutment between said front shoulder and said corresponding shoulder of the box are accomplished at the final stage of make-up, and upon completion of make-up said tip shoulder of the pin and said corresponding shoulder of the box do not substantially provide any sealing effect.

3 Claims, 8 Drawing Figures

THREADED JOINT WITH HIGH GAS-LEAK-TIGHTNESS FOR OIL AND GAS WELL PIPE

BACKGROUND OF THE INVENTION

In recent years, the trend has been toward drilling deeper gas wells with higher pressure and as a result, demand has risen for a joint for oil and gas well pipes having performance properties superior to those employing API threads (round, buttress) and having high tensile joint strength and excellent gas-leak-tightness as well as resistance to corrosion and erosion. Among the desired properties of such joints, gas-leak-tightness is especially important. This is because the leakage of an inflammable gas might lead to fire or explosion while the leakage of a poisonous gas such as hydrogen sulfide might cause a disastrous accident.

As conventional ways to enhance the gas-leak-tightness of a threaded portion, it is known to make the clearance as small as possible by strictly controlling the machining tolerance, to plate the threaded portion with a soft metal such as Sn having high malleability, and to apply to the threaded portion a compound grease mixed with a very fine metallic powder and a mineral oil thickened with a calcium stearate or a lithium stearate. Also, it is known to be important to control the torque and number of turns at the time of make-up. However, even with these means, the leakage of gas cannot be perfectly prevented under the conditions of high temperature and high pressure currently being encountered in gas and oil wells. Because of this, special types of joints have been used to improve gas-leak-tightness. Those of one type have a seal portion which employs metal-to-metal contact between a pin (steel pipe) and a box (coupling) forming the joint, while those of another type have an annular groove with a Teflon ring inserted therein.

Several special joints of the former type are known. For example, in one of such joints peripheral shoulder having a convex conical inner face is provided as the inner end portion of the box, a non-threaded inner face extending between the end of the threaded portion and said peripheral edge shoulder is provided in correspondence thereto, the end of the pin is formed as a concave conical inner face and a non-threaded outer face is provided between the threaded portion and the end of the pin (Japanese Patent Publication No. 18096/1970). This joint is characterized in that the concave conical face of the male thread and the convex conical face of the female thread abut to effect metal-to-metal contact.

On the other hand, as a special joint similar to said joint, there is known one wherein a peripheral shoulder having a convex conical inner face is provided on the inner end portion of the box and a non-threaded slant face is formed on the tip of the inner thread of the box to give the pin a shape corresponding to that of the box. In this joint the first seal portion is formed by concave and convex conical shoulder faces similar to the above mentioned joint. However, there is the difference that the expanded portions are provided on the pin and the slant face of the box to form the second seal portion by means of metal-to-metal contact between these portions (Laid-Open Patent Application No. 17125/1973).

In the special joint based on the metal-to-metal contact for assuring gas-leak-tightness, such effects as are described in the respective specifications can be expected. However, these joints suffer the following problems:

First, in the former case, the tip of the pin is the only sealing spot. Therefore, in order to obtain effective metal-to-metal contact, it is necessary to make up for this by using a large torque sufficient to compensate for the clearance caused by machining error. However, excessive make-up is apt to cause uneven plastic deformation at the contact portion, as will be explained later. Therefore, initial gas-leak-tight effect is apt to be considerably decreased at the time of repeat make-up, and, moreover, galling cracks are likely to occur on the thread portion. This is a critical problem since repeat make-up is effected up to three times on casings and up to ten times on tubings, and in either case, it is, of course, essential that no cracks occur and high gas-leak-tightness be assured.

In the actual use environment of a well pipe joint, the gas-leak-tightness under tension, compression and bending load etc. also become an important factor. For example, when internal pressure and tensile load act on the joint, there is a danger that the interfacial pressure of the sealing portion effecting metal-to-metal contact may decrease with the increase in tensile load, finally causing minute clearance between the gas-leak-tight faces. Also, since the precision-machined sealing face on the tip of the pin is completely exposed, it is apt to be marred in the field regardless of how much care is taken. When the sealing face is damaged, it is difficult to maintain the gas-leak-tightness of the metal-to-metal contact.

On the other hand, the joint described in said Laid-Open Patent Application No. 17125/1973 has higher contact face pressure on the expanded face of the non-threaded slant face provided on the pin and the box, so that even if the make-up is effected with considerably lower torque than that used with the joint described in said Patent Publication No. 18096/1970, a comparable gas-leak-tightness can still be obtained. However, there is the disadvantage that even though a higher interfacial pressure is obtained, the metal-to-metal contact made by the expanded portion is nearly linear, meaning that high machining accuracy is required in the contact portion. Therefore, clearance at any part of the circumference will cause leakage. Moreover, if excessive load is imposed, the line contact position will shift, causing a decrease in face pressure and lowering gas-leak-tightness.

SUMMARY OF THE INVENTION

The object of this invention is to provide a joint for gas and oil well pipe which has excellent gas-leak-tightness and is free from the various problems of ordinary metal-to-metal contact type gas-leak-tight joints.

An outline of the construction of the joint according to this invention will now be given.

In the screw joint of a pipe comprising a box having an internal female thread and a pin having an external male thread which are screwed together, a non-threaded tip portion of the pin is provided with two shoulders and a conical face disposed between them, and the box is provided with two shoulders and a conical face having shapes corresponding to the shapes of the shoulders and the conical face provided on the pin tip. When the joint is made up, the conical faces form the first metal-to-metal contact sealing region. Next, the shoulder nearer the male thread abuts with the shoulder nearer the female thread to control the make-up position and at the same time to form the second sealing region. On the other hand, the non-threaded extremity of the pin tip and the deepest shoulder of the box have no sealing function. Namely, the joint of this invention is such that a conical face for sealing and a shoulder for controlling sealing and fixing the make-up position are arranged side by side so as to provide perfect sealing performance.

DETAILED EXPLANATION OF THE INVENTION

This invention will be described in detail on the basis of the drawings.

Figure 1:
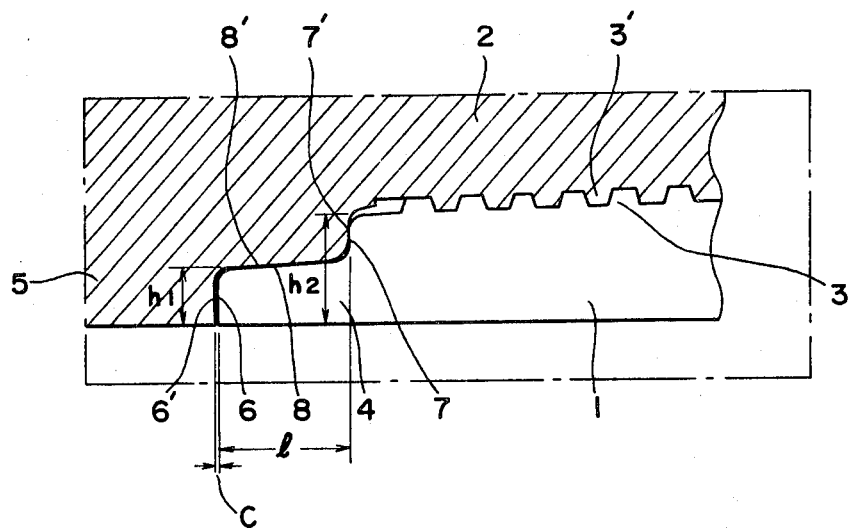
FIG. 1 is a fragmentary cross-sectional view, showing the construction of a threaded joint according to this invention.

FIG. 1 is an enlarged sectional view of the main portion of a joint according to this invention showing the fit between the pin and the box. A pipe body 1 is machined into a tip having a tapered male thread 3 near one end, two shoulders 6, 7 formed at right angles to the pipe axis at its extremity, and a conical sealing face 8 formed between these shoulders. A box 2 is machined to have a female thread 3' for engagement with said male thread 3, and two shoulders 6', 7' and a conical sealing face 8' provided to match the shape of the tip.

The two pairs of shoulders are designed so that at the time of make-up the shoulders 7, 7' on the thread side abut to form a sealing portion, whereas the shoulders 6, 6' remain separated by a clearance c or come into only slight contact with each other without establishing any substantial sealing function. At this time the conical faces of the pin 1 and the box 2 act as identically inclined sealing faces in metal-to-metal contact.

The sealing function of the threaded joint according to this invention will now be explained.

By making up the threaded joint, the conical face 8 on the pin tip and the conical face 8' on the box corresponding thereto are first contracted to form a first sealing face. As the make-up advances, the interference between the contacting faces, i.e. the face-to-face pressure, will increase and the sealing effect will be improved. To obtain the greatest gas-leak-tightness possible without yielding of the non-threaded portion of the pin tip, sufficient circumferential compression deformation is first given to the tip of the pin and then the shoulders 7, 7' of the pin and the box are brought into abutment. Subsequent tightening of the screw causes the shoulders 7, 7' to form a second sealing face to complete the make-up. At this time, a clearance remains between the other pair of shoulders 6, 6'. It is not critical whether the non-threaded shoulders of the pin tip are formed at right angles or at some other angle of inclination to the pipe axis as this angle has no bearing on the gas-leak-tightness.

The joint of the aforesaid structure has the following characteristics as regards gas-leak-tightness:

(1) The formation of the first and the second sealing faces raises the interface pressure and enhances the gas-leak-tightness.

(2) By fixing the make-up position, plastic deformation and galling of the first sealing faces and the screw engaging portion can be prevented. Therefore, repeated make-ups can be carried out without any loss in gas-leak-tightness from that in the first make-up.

(3) The designing of the pin tip to have the conical sealing face 8 with a shoulder (6, 7) in the fashion of a step on either side gives two sealing regions on the pin side. Because of this structure, the shoulder 7 and the conical face 8 form a depression that reduces susceptibility to damage by impact. This is a new idea not found in conventional joints. When internal pressure and excessive tensile load come to bear on the threaded joint, although the interfacial pressure at the second sealing faces will be decreased by the tensile load, the first sealing faces will be unaffected by the tensile load because of the large interfacial pressure in the circumferential direction produced by the screw tightening during make-up. As a result sealing against internal pressure is maintained.

(4) To prevent erosion and corrosion, a small clearance c is provided between the non-threaded tip shoulder 6 of the pin tip and the shoulder 6' of the box at the completion of make-up. This clearance is also effective for preventing excessive deformation, if, for instance, the shoulder 6 of the pin tip should, because of the thinness of the tip, abut against the shoulder 6', and for preventing loss of gas-leak-tightness should the abutment be uneven because of deformation of the pin tip by impact etc.

Figure 2:
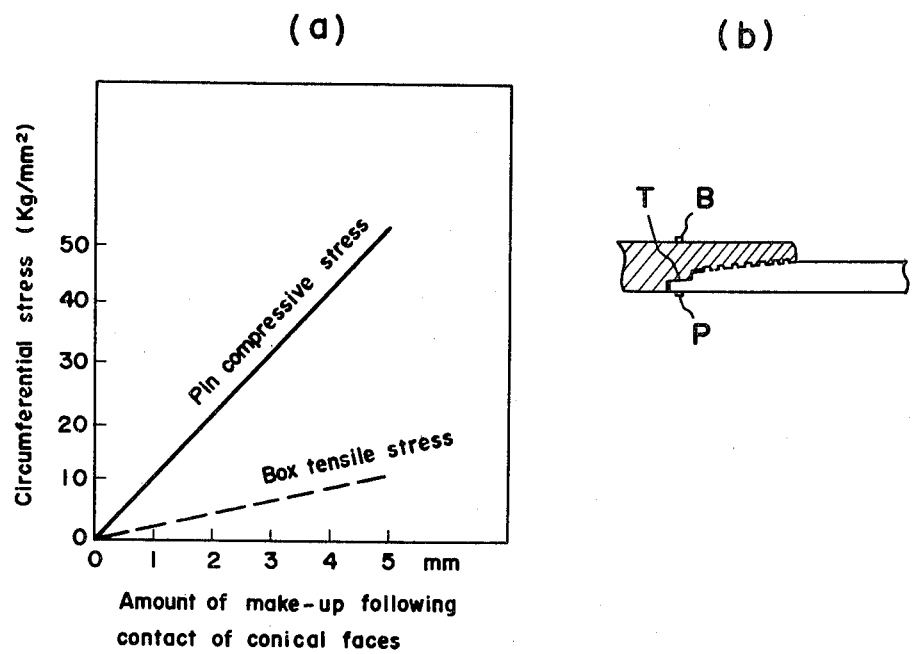
FIG. 2(a) is a diagram showing the stress on the thin inner face of the non-threaded pin tip and on the outer face of the box at the time of making up a threaded joint according to this invention.
FIG. 2(b) is an explanatory drawing of a test method for preparing FIG. 2(a).

(5) The conical portion of the unthreaded tip of the pin is made thin and, therefore, as shown in FIG. 2(a), the deformation of the box is about ¼ of the deformation stress of the pin and the pin tip portion is easily deformed. Sufficient sealing pressure can therefore be obtained with lower torque than in the ordinary thread joint.

FIG. 2(b) is an explanatory drawing showing the test method for obtaining the data for FIG. 2(a). In FIG. 2(b), P is a pin strain gauge, B a box strain gauge and T a tapered face (7"0.D×321 lbs/ft.L80).

Figure 3:
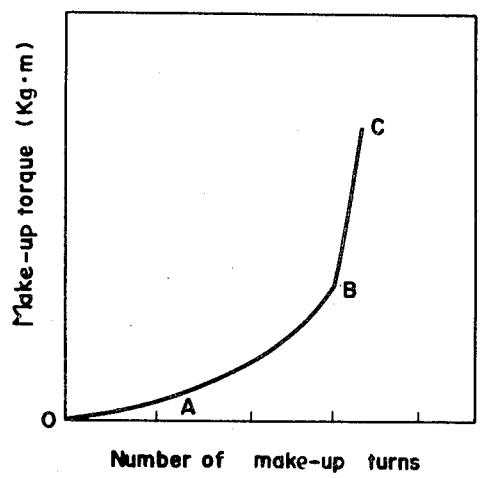
FIG. 3 is a diagram showing the relation between make-up torque and the number of make-up turns.

(6) FIG. 3 is a drawing showing the relation between the make-up torque and the number of make-up turns of the threaded joint according to this invention. In a threaded joint having a tapered thread, the make-up torque rises gradually. Namely, the make-up torque is as shown by OA in the drawing. The conical face 8 of the non-threaded portion of the pin tip and the conical face 8' of the box corresponding thereto are contacted at the point A and by the make-up between A and B, the interfacial pressure (at the first sealing faces) necessary for maintaining gas-leak-tightness on the conical faces 8, 8' is obtained. Point B represents the abutment point between the non-threaded shoulder 7 of the pin tip and the shoulder 7' of the box corresponding thereto (the second sealing faces), where the torque suddenly increases after abutment to produce the interfacial pressure necessary for the abutting faces. Thus the make-up is completed at the point C. Therefore, the interval between B and C is made larger than that in the ordinary threaded joint so that torque control can be easily effected.

Taken together, these effects of the present invention constitute a quantum improvement on conventional art.

In the foregoing, a general explanation was given concerning the function of the threaded joint according to this invention. Now, some practical examples will be described.

Figure 4:
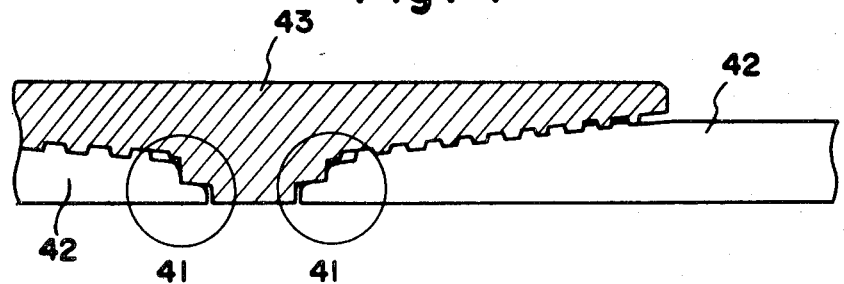
FIG. 4 to FIG. 7 are fragmentary cross-sectional views showing practical examples of the threaded joint with high gas-leak-tightness for oil and gas well pipe according to this invention.

FIG. 4 shows an example of this invention in the threaded joint of a coupling comprising pins 42 and a coupling 43. Portions 41 within circles at the tips of pins 42 form a threaded joint with high gas-leak-tightness having a sealing structure comprising two-step shoulders according to this invention.

Figure 5:
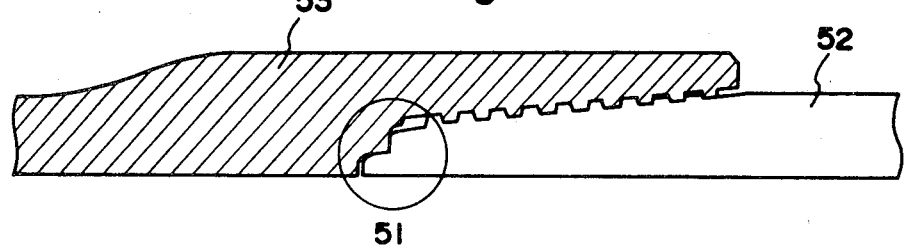

FIG. 5 shows an example of an integral type threaded joint according to this invention, comprising a pin 52 and a box 53 with the box 53 only being upset. The portion 51 within a circle at the tip of the pin 52 has a sealing structure consisting of two-step shoulders according to this invention and high gas-leak-tightness can be obtained against internal gas pressure.

Figure 6:
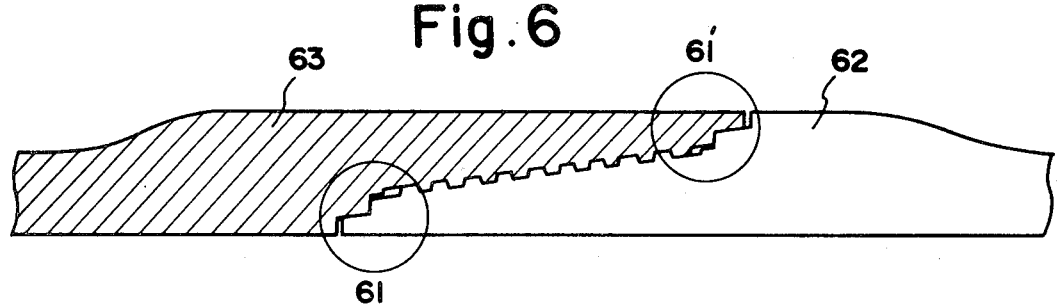

FIG. 6 is an integral type threaded joint with both of a pin 62 and a box 63 being upset. In this case, a two-step shoulder sealing structure according to this invention is provided on the inner faces of the pin 62 and the box 63 and a two-step shoulder sealing structure 61' is provided also on the outer faces thereof. The joint thus maintains high gas-leak-tightness against external and internal gas pressure and has flush internal and external face lines which give excellent corrosion resistance.

Figure 7:
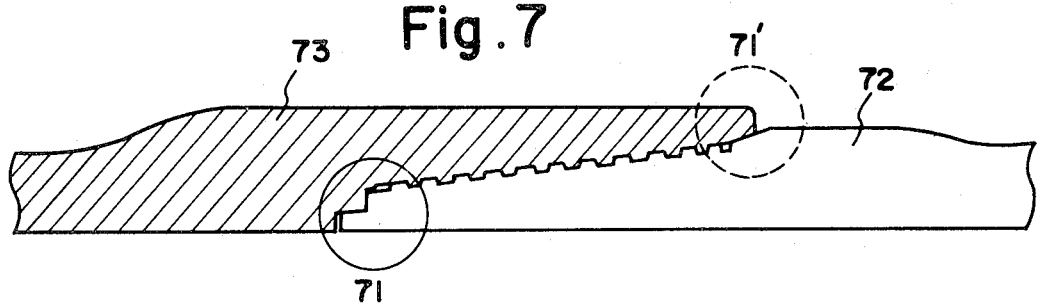

FIG. 7 is an integral type threaded joint comprising a pin 72 and a box 73, in which the amount of upset of the pin 72 is reduced and a two-step shoulder sealing structure 71 according to this invention is provided on the tip of the pin 72. The outer face of the joint is further provided with a metal-to-metal contact sealing portion 71' employing an ordinary conical face such as the outer face of a Hydril's triple seal. This threaded joint has high gas-leak-tightness against internal and external pressure (of gas or oil) and has high joint strength.

The inventors conducted a test of a threaded joint according to this invention using a coupling type joint as shown in FIG. 4. An API, 5B buttress thread cut on an API, 5A, L80 grade steel pipe having an outside diameter of 177.8 mm and a wall thickness of 11.51 mm was machined to provide it with a threaded joint wherein the heights of the shoulders 6, 7 of the non-threaded portion of the pin tip where $h_1$: 2.5 mm and $h_2$: 5.5 mm, respectively, and the length of the sealing face 8 was l: 6 mm (see FIG. 1). The joint was made up and loosened several times, whereafter it was subjected to nitrogen gas pressure of 637 kg/cm² (equal to 80% of its internal yield pressure) and to a tensile load of 338 Ton (equal to 80% of its yield strength). In this condition, it was subjected to 100 heat cycles between 163° C. and 67° C. No loss in gas-leak-tightness of the joint was observed whatsoever and it was confirmed that the joint has excellent gas-leak-tight performance in practice.

What is claimed is:

1. A threaded joint with high gas-leak-tightness for oil and gas well pipe comprising: a box having a female thread on its inner face and a pin having a male thread on its outer face, said box and pin being screwed together in use; a non-threaded tip portion of said pin having a front shoulder and a tip shoulder arranged stepwisely, a conical face tapered convergently toward the tip side being formed between said front shoulder and said tip shoulder; a non-threaded portion of said box corresponding to said non-threaded tip portion of said pin having two shoulders corresponding respectively to said front shoulder and said tip shoulder on said non-threaded tip portion of said pin and a conical face between said two shoulders corresponding to said conical face on said non-threaded tip portion of said pin; whereby, when said pin and said box are made up, a first sealing region is formed by metal-to-metal contact of said conical faces and a second sealing region is formed at the final stage of make-up by the abutment between said front shoulder of said pin and said corresponding shoulder of said box and said tip shoulder of said pin and said corresponding shoulder of said box form no substantial sealing region at the time of completion of make-up.

2. A threaded joint with high gas-leak-tightness according to claim 1, wherein said threaded joint is of coupling type.

3. A threaded joint with high gas-leak-tightness according to claim 1, wherein said threaded joint is of integral type.

* * * * *